US006590696B2

United States Patent
Yanagisawa et al.

(10) Patent No.: US 6,590,696 B2
(45) Date of Patent: Jul. 8, 2003

(54) IMAGE DISPLAY MEDIUM AND IMAGE DISPLAY DEVICE USING THE IMAGE DISPLAY MEDIUM

(75) Inventors: Masahiro Yanagisawa, Kanagawa-ken (JP); Minoru Umeda, Shizuoka-ken (JP)

(73) Assignee: Ricoh Company Limited, Tokyo (JP)

( * ) Notice: Subject to any disclaimer, the term of this patent is extended or adjusted under 35 U.S.C. 154(b) by 217 days.

(21) Appl. No.: 09/873,252

(22) Filed: Jun. 5, 2001

(65) Prior Publication Data

US 2002/0027701 A1 Mar. 7, 2002

(30) Foreign Application Priority Data

Jun. 5, 2000 (JP) .......................... 2000-168181
May 30, 2001 (JP) .......................... 2001-162750

(51) Int. Cl.[7] .............................. G02F 1/167
(52) U.S. Cl. ........................ 359/296; 359/265
(58) Field of Search ................... 359/296, 253, 359/265, 452; 345/107, 105, 108; 430/35, 38, 19; 204/477, 622, 450

(56) References Cited

U.S. PATENT DOCUMENTS 5,380,362 A * 1/1995 Schubert ............ 106/493
5,914,806 A    6/1999 Gordon, II et al.
6,113,810 A * 9/2000 Hou et al. ............ 252/572

FOREIGN PATENT DOCUMENTS

| JP | 40-7047 | 4/1965 |
| JP | 1-300231 | 12/1989 |
| JP | 5-173194 | 7/1993 |
| JP | 9-500458 | 1/1997 |

OTHER PUBLICATIONS

F. A. Waite, et al., "The development of graft copolymers as macromolecular surfactants for use in non–aqueous media", J. Oil. Col. Chem. Assoc., vol. 54, pp. 342–350, 1971.

* cited by examiner

Primary Examiner—Scott J. Sugarman
Assistant Examiner—Richard Hanig
(74) Attorney, Agent, or Firm—Oblon, Spivak, McClelland, Maier & Neustadt, P.C.

(57) ABSTRACT

An image display medium including a pair of electroconductive layers, at least one of which is light-transmissive and which are opposed each other to form a cell; and a dispersion contained in the cell, wherein the dispersion includes a colored particulate material having at least one of an acidic group and a basic group; a hydrocarbon solvent; a resin soluble in the hydrocarbon solvent and having at least one of a basic group and an acidic group; and a compound having a nonionic polar group, and wherein when the particulate material has an acidic group, the resin has a basic group, and when the particulate material has a basic group, the resin has an acidic group.

20 Claims, 4 Drawing Sheets

FIG. 5

IMAGE DISPLAY MEDIUM AND IMAGE DISPLAY DEVICE USING THE IMAGE DISPLAY MEDIUM

BACKGROUND OF THE INVENTION

1. Field of the Invention

The present invention relates to an image display medium, and more particularly to an image display medium in which an image is reversibly displayed by the movement of charged particles upon application of an electric field. In addition, the present invention relates to an image display device using such an image display medium.

2. Discussion of the Background

Display devices such as cathode ray tubes (CRTs) and liquid crystal displays (LCDs) have been used as an image display terminal for displaying images such as letters, static images and moving images. These devices can instantaneously display images (i.e., digital data) and rewrite the images. However, these devices have various drawbacks. For, example, it is a hard work to always carry such devices. In addition, to see such a display device for a long period of time causes eye fatigue. Further, when such a display device is turned off, images therein are disappeared.

When images such as letters and static images are distributed or stored as a document, the images are typically recorded on a paper medium as a hardcopy by a printer. Images on such a hardcopy are easier to read than those in the display devices mentioned above. In addition, when reading images on hardcopies, the degree of eye fatigue is much less than that when reading images in the display devices. Further, a reader can see images on hardcopies while having a free posture. Furthermore, hardcopies can be easily carried because of having lightweight. However, hardcopies have a problem in view of material saving such that much labor and costs are necessary to recycle used hardcopies.

Therefore, a need has been existed for a paper-thin image display medium having a combination of the advantages of the above-mentioned display devices and the advantages of hardcopies. Until now, display media using a liquid crystal dispersed in a polymer, a bistable cholesteric liquid crystal, an electrochromic material, an electrophoretic material, etc. have been proposed. These media are a reflection type and therefore can display high contrast images. In addition, the media can be used as a memory display medium (i.e., the media have an image maintaining ability even when the power is off). Among these media, devices using an electrophoretic material have advantages such as good display qualities and low power consumption.

Japanese Laid-Open Patent Publication No. 5-173194 discloses an electrophoretic display medium. The display medium has a pair of parallel electrodes, at least one of which is transparent and in which a dispersion including electrophoretic particles is contained. By applying a voltage to the electrodes, the electrophoretic particles adhere to the transparent electrode, resulting in formation of an image. By applying another voltage, the particles adhered to the transparent electrode release from the electrode, resulting in erasure of the image.

Japanese Patent No. 2,612,472 (Japanese Laid-Open Patent Publication No. 1-300231) discloses an electrophoretic display medium. The device has a pair of parallel electrodes, at least one of which is transparent and in which a dispersion including electrophoretic particles is contained while the dispersion is separated into many cells (domains) by a porous spacer. A typical embodiment of the device is shown in FIG. 3.

Figure 3:
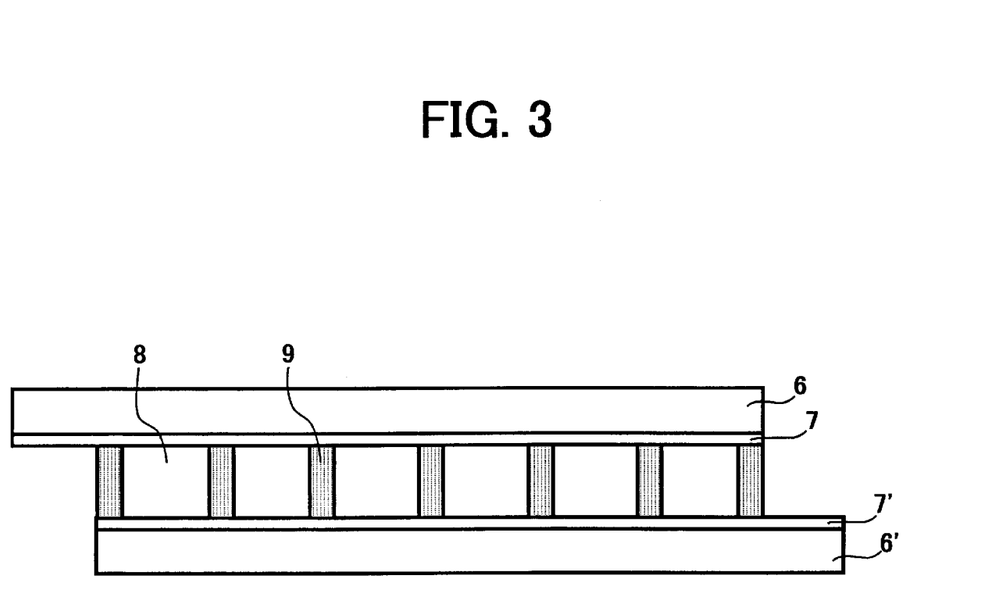
FIG. 3 is a schematic view illustrating the cross section of another embodiment of the image display medium of the present invention.

In FIG. 3, numerals 6 and 6' denote transparent substrates made of glass. Numerals 7 and 7' denotes pattern electrodes formed on the substrates 6 and 6', respectively. A dispersion 8 including electrophoretic particles whose color is different from the color of the dispersing medium are contained in the cell formed of the pair of substrates 6 and 6'. The surfaces of the electrophoretic particles are charged in the dispersing medium. When a voltage having a polarity opposite to the charge of the electrophoretic particles is applied to the electrode 7, the particles move toward the electrode 7, resulting in deposition of the particles on the electrode 7. To the contrary, when a voltage having the same polarity as the charge of the electrophoretic particles is applied to the electrode 7, the particles move toward the substrate 6', and thereby the color of the dispersing medium can be seen from the side of the electrode 7. Thus, images can be reversibly displayed. When the dispersion 8 is simply contained in the cell without providing spacers 9, uneven images are often displayed due to aggregation of the electrophoretic particles and adhesion of the particles to the electrode 7. Therefore, a mesh-like or porous spacer 9 is provided in the cell to stably display images. In the display device having such a construction, it is difficult to evenly contain the dispersion into the thus separated cells. Alternatively, there occurs a trouble such that when the dispersion is contained in the cell, the properties of the dispersion often change, resulting in formation of images having undesired image qualities.

It is well known that the dispersion of the particles is stabilized by electrostatic repulsion effect and a stereo effect (i.e., an adsorption layer effect). With respect to the electrostatic repulsion effect, a DLVO theory is established. In this theory, the thickness of the electric double layer and the phase boundary potential (i.e., the so-called $\zeta$ potential) are important factors. Therefore, ions for forming such an electric double layer and a phase boundary potential are needed. Several investigations have been made for aqueous dispersion which can easily include such ions.

With respect to the stereo effect, a theory corresponding to the DLVO theory has not yet been established. An investigation using a non-aqueous dispersion system (e.g., petroleum solvent dispersion systems) is reported by F. A. Waite in J. Oil Col. Chem. Assoc., 54, 342 (1971). This investigation relates to a fundamental method for manufacturing a stable non-aqueous solvent dispersion. In this method, a block or graft copolymer which has both a component compatible with the particles dispersed in a dispersing medium and another component soluble in the dispersing medium is used.

Japanese Patent Publication No. 40-7047 discloses a method for manufacturing a dispersion, which utilizes the above-mentioned method. In the method, methyl methacrylate is radically polymerized in a hydrocarbon solvent in the presence of a degradable rubber to prepare a stable polymethyl methacrylate dispersion. It is considered that methyl methacrylate is graft-copolymerized with the degradable rubber because it is not considered that the polymethyl methacrylate particles adsorb the degradable rubber. It is considered that when the graft copolymer is included in a display dispersion, the insoluble part of the graft copolymer associates with the surface of particles therein, and the soluble part has a stereo effect. Thus, the dispersion stability of the particles can be maintained.

With respect to the dispersion improving method using a stereo effect, U.S. Pat. No. 5,914,806 discloses a method using pigment particles combined with a polymer dispersant by a covalent binding. In this dispersion, the dispersion stability of the particles is not satisfactory because the electrostatic repulsion effect is not exerted although the stereo effect can be exerted.

Japanese Patent Publication Ko-Hyo No. 9-500458 (i.e., WO95/02636) discloses that the dispersion stability of a dispersion can be enhanced due to both the stereo effect and the electrostatic repulsion effect caused by using a combination of a pigment having an acidic moiety with a polymer dispersant having an amino group. However, in this method pigments used for the electrophoretic particles are limited because they must have an acid therein. In addition, an acid/base dissociation hardly occurs in a non-aqueous solvent, and therefore only little electrostatic repulsion effect can be obtained.

Because of these reasons, a need exists for an image display medium which can reversibly display images having high contrast and resolution and which has an image maintaining ability and high response. In addition, a need exists for an image display medium which has a high flexibility in material selection and a good stability so as to be practically used for a long period of time.

SUMMARY OF THE INVENTION

Accordingly, an object of the present invention is to provide an image display medium which can reversibly display images having high contrast and resolution and which has an image maintaining ability and high response.

Another object of the present invention is to provide an image display medium which has a high flexibility in material selection and a good stability so as to be used for a long period of time.

Yet another object of the present invention is to provide an image display device which reversibly display images having high contrast and resolution and which has an image maintaining ability and high response so as to be practically used for a long period of time.

Briefly these objects and other objects of the present invention as hereinafter will become more readily apparent can be attained by an image display medium for displaying an image by electrophoresis, including a pair of electroconductive layers, at least one of which is light-transmissive and which are opposed each other to form a cell, and a dispersion contained in the cell, wherein the dispersion includes a colored particulate material having an acidic group or a basic group, a hydrocarbon solvent, a resin which is soluble in the hydrocarbon solvent and which has a basic group or an acidic group, and a compound having a nonionic polar group, and wherein when the colored particulate material has an acidic group, the resin has a basic group, and when the colored particulate material has a basic group, the resin has an acidic group.

Preferably the resin further has a nonionic polar group and/or the colored particulate material further has a nonionic polar group.

The colored particulate material preferably has a particle diameter of from 0.1 to 10 μm. In addition, the colored particulate material preferably includes a colorant and a resin having an acidic group or a basic group, wherein the weight ratio (C/R) of the colorant (C) to the resin (R) is 0.1/100 to 1000/100.

In addition, the dispersion preferably includes water in an amount of from 100 to 2000 ppm.

In another aspect of the present invention, an image display device is provided which includes the image display medium mentioned above and at least one of a voltage applicator and a connector through which a voltage is applied to the device.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION OF THE INVENTION

The image display medium of the present invention will be explained in detail referring to drawings.

Figure 1:
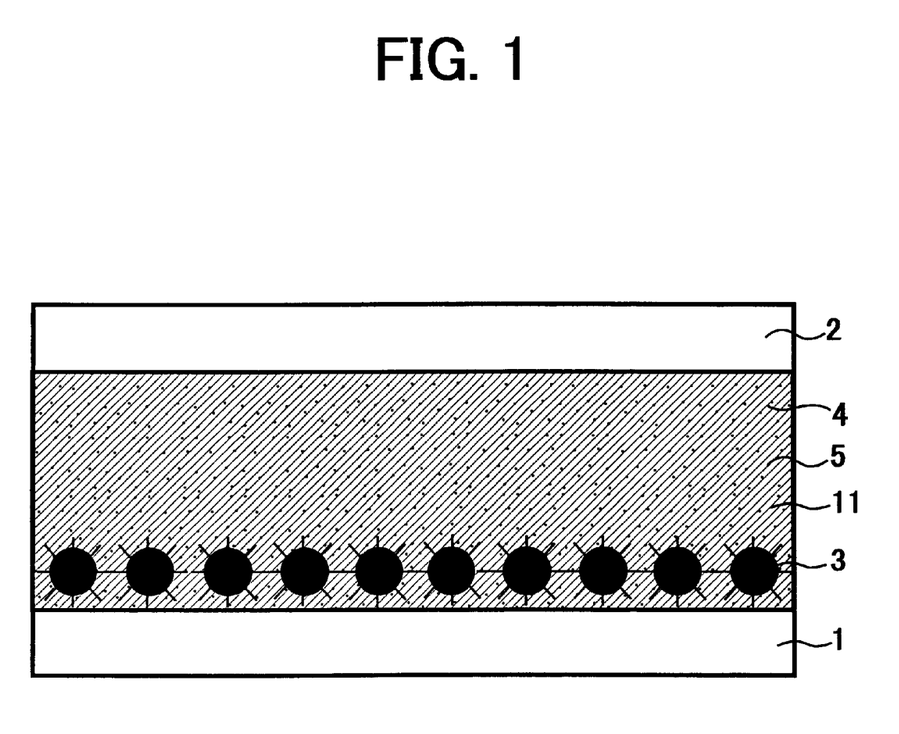
FIG. 1 is a schematic view illustrating the cross section of an embodiment of the image display medium of the present invention.

FIG. 1 is a schematic view illustrating the cross section of an embodiment of the image display medium of the present invention. In FIG. 1, numerals 1 and 2 denote electroconductive layers. Either or both of the layers 1 and 2 are light-transmissive. The layers 1 and 2 form a cell in which a dispersion including a colored electrophoretic particulate material 3 which has a white color or a color other than white, a hydrocarbon solvent 4, a resin 5 soluble in the hydrocarbon solvent 4, and a compound having a nonionic polar group 11. A dye having a color different from the color of the particulate material 3 is preferably dissolved in the solvent 4 to color the solvent 4.

Provided that the layer 2 is light-transmissive, the color of the particulate material 3 can be seen when the display medium is observed from a point over the layer 2. At this point, the resin 5 is adsorbed on the particulate material 3, resulting in enhancement of dispersion stability of the particulate material 3 due to the stereo effect of the resin 5.

Figure 2A:
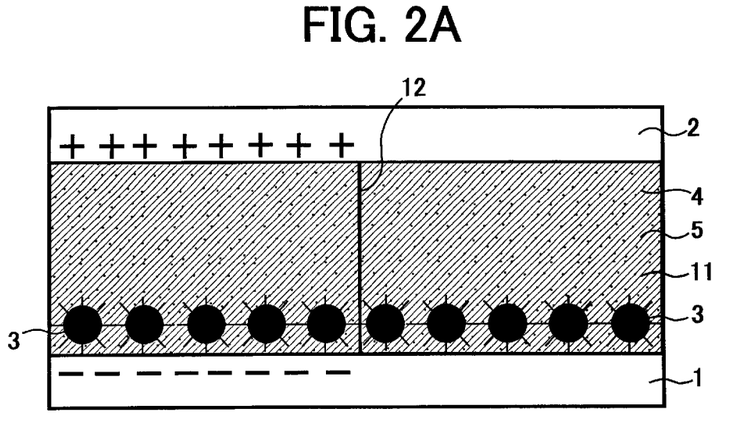
FIGS. 2A–2C are schematic views for explaining how an image is formed in the image display medium of the present invention.
Figure 2B:
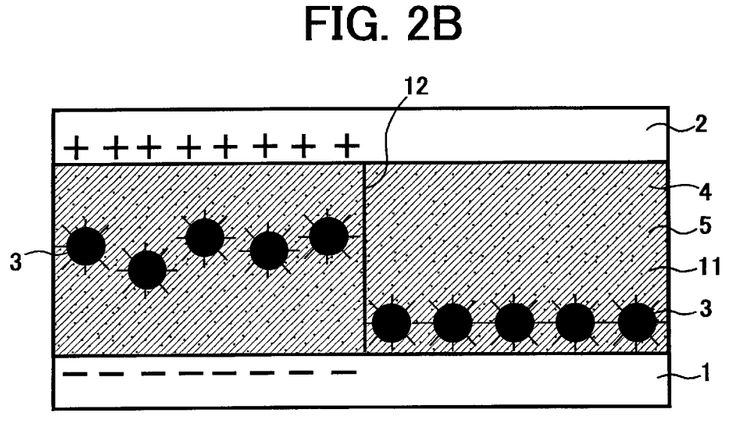
Figure 2C:
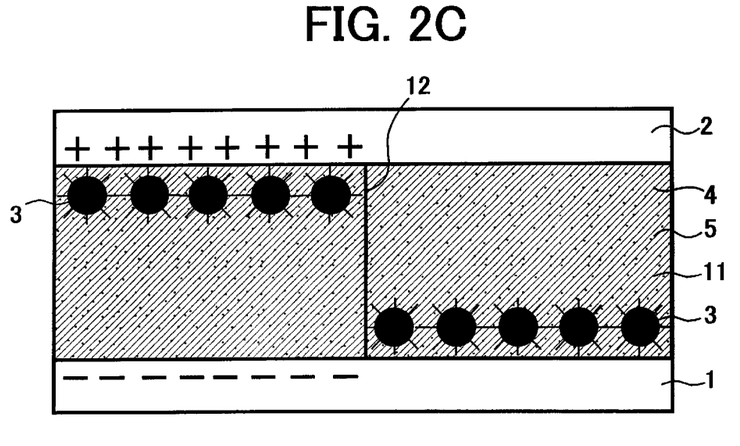

FIGS. 2A–2C are cross-sectional views for explaining the image displaying mechanism of the image display medium of the present invention. The cell is separated by a spacer 12. When a charge (hereinafter referred to as an external charge) is applied from outside by a proper charge applicator (i.e., a voltage applicator) to the dispersion included in the left cell formed by the electroconductive layers 1 and 2 as shown in FIG. 2A, the colored particulate material 3, which has a charge, moves upward due to the electric field formed by the external charge as shown in FIG. 2B. In FIG. 2C, the colored particulate material 3 reaches the electroconductive layer 2. At this point, the colored particulate material 3 electrostatically adheres to the layer 2, resulting in termination of movement of the particulate material 3. When the display medium is seen from a point over the layer 2, the left side of the display medium in FIG. 2C has the color of the particulate material 3, and the right side of the display medium has the color of the dye added to the hydrocarbon solvent 4.

This image display process is reversible, and therefore the image display medium can be repeatedly used.

As mentioned above, in conventional non-aqueous solvent type dispersions, in particular, in nonpolar aprotic solvent type dispersions, it is not clear whether ions or charges are present therein. The reason is considered to be that in such solvents an interaction (i.e., salvation) between ions and solvent molecules tends not to be caused. Therefore, the present inventors investigate nonpolar aprotic solvent type dispersions including (a) an organic material having at least an acidic group, (b) an organic material having at least a basic group and (c) an organic material which is compatible with the nonpolar aprotic solvent and which has a nonionic polar group. At this point, one of the components (a) and (b) may be copolymerized with the component (c).

As a result of the investigation, it is discovered that the components (a) and (b) cause an acid-base ionic dissociation. In addition, the presence of an ion-dipole interaction (i.e., salvation) is also discovered. Namely, it is discovered that when the components (a), (b) and (c) are present in the solvent mentioned above, ions can be stably present in such a nonpolar aprotic solvent due to an acid-base dissociation with a salvation of the polar group of the component (c). This is true whether the components (a) and (b) are soluble in the solvent or not.

In addition, it is also discovered that when a particulate material such as pigments and metal oxides is present in the system including the components (a), (b) and (c), the particulate material can be dispersed more stably. The reason is considered to be that the acidic or basic group of the components (a) and (b) is combined with the particulate material by chemical bonding, adsorption, etc., and fixed thereon. Thereby ionic dissociation occurs at the interface between the surface of the particulate material and the solvent while the salvation of the component (c) occurs at the same time. As a result thereof, the particulate material is uniformly charged positively or negatively. Thus, the particulate material can be stably dispersed by the synergy effect of this electrostatic effect and a stereo effect.

In addition, the present inventors discover that the quantity of the ions and the charge quantity of the particulate material can be controlled by changing the species of the components (a), (b) and (c) and controlling the addition quantities thereof. The present invention is made based on this knowledge.

The constituents of the image display medium of the present invention will be explained in detail.

At least one of the electroconductive layers 1 and 2 is light-transmissive. The electroconductive layers 1 and 2 can be formed, for example, by any one of the following methods:

(1) Forming a thin layer of a metal such as Al, Ag, Ni and Cu or a transparent electroconductive material such as ITO (indium tin oxide), $SnO_2$ and ZnO:Al by a method such as sputtering, vacuum evaporation, CVD (chemical vapor deposition) or coating methods; and (2) Forming a layer by coating a coating liquid in which an electroconductive material is mixed with a solvent optionally together with a binder such as resins and then drying the coated liquid.

Specific examples of such electroconductive materials include cationic polymer electrolytes such as polymethylbenzyltrimethylammonium chloride, and polyallylpolymethylammonium chloride; anionic polymer electrolytes such as polystyrenesulfonic acid salts and polyacrylic acid salts; and electronic conductors such as zinc oxide, tin oxide and indium oxide. The electroconductive layers may be so thick as to have a self-holding function (namely, the layers are so thick to form a cell by themselves). Alternatively, the electroconductive layer may be formed on a substrate having a self-holding function, such as glass plates and plastic plates.

The electroconductive layers 1 and 2 may be a layer having an aeolotropic conductivity, or a layer having a patterned or multi-dot segment in which a conductive portion is formed through the thickness direction of the layer. In any case, when an electrode of a power supply is contacted with the electroconductive layers 1 and 2, an electric field can be formed between the electroconductive layers 1 and 2. Thus, images can be easily formed by simply applying a voltage with a voltage applicator. Therefore it is very simple.

The thickness of the cell formed by the two electroconductive layers 1 and 2 is preferably from 5 to 200 μm, and more preferably from 10 to 150 μm. When the cell is too thin, the image contrast decreases. To the contrary, when the cell is too thick, an excess voltage is needed to form an image.

The colored particulate material 3 has an acidic group or a basic group on the surface thereof. In addition, the resin soluble in the hydrocarbon solvent used has a basic group or an acidic group, it is preferable that when the particulate material has an acidic group, the resin soluble in the hydrocarbon solvent has a basic group, and when the particulate material has a basic group, the resin soluble in the hydrocarbon solvent has an acidic group. When such a combination is used, an acid-base dissociation occurs between the acidic group (or the basic group) of the particulate material and the basic group (or the acidic group) of the resin soluble in the hydrocarbon group.

In addition, when a compound having a nonionic polar group is present in the dispersion, ions are generated at the interface between the particulate material and the solvent while a salvation occurs. As a result, the particulate material is uniformly charged positively or negatively, and therefore the particulate material can be dispersed more stably than ever by the synergy effect of the electrostatic effect and stereo effect.

Suitable materials for use as the colored particulate material include known colorants such as dyes and pigments which are dispersed in a binder resin which is insoluble in the hydrocarbon solvent included in the dispersion. The resin preferably has an acidic group or a basic group and is typically prepared by polymerizing or copolymerizing one or more monomers having an acidic group or a basic group.

Specific examples of such binder resins insoluble in hydrocarbon solvent and having an acidic group include polymers and copolymers including at least a monomer having an acidic group as a constituent. Specific examples of such a monomer having an acidic group include (meth) acrylic acid, maleic acid, maleic anhydride, itaconic acid, itaconic anhydride, fumaric acid, cinnamic acid, crotonic acid, vinylbenzoic acid, 2-methacryloxyethylsuccinic acid, 2-methacryloxyethylmaleic acid, 2-methacryloxyethylhexahydrophthalic acid, 2-methacryloxyethyltrimellitic acid, vinylsulfonic acid, allylsulfonic acid, styrenesulfonic acid, 2-sulfoethylmethacrylate, 2-acrylamide-2-methylpropanesulfonic acid, 3-chloroamidephosphoxypropylmethacrylate, 2-methacryloyloxyethylacidphosphate, hydroxystyrene, etc.

Specific examples of other monomers, which can be copolymerized with the monomers having an acidic group mentioned above include alkyl or aryl esters of (meth)acrylic acid such as 2-ethylhexyl (meth) acrylate, octyl (meth)acrylate, nonyl (meth)acrylate, decyl (meth)acrylate, lauryl (meth)acrylate, stearyl (meth)acrylate, vinyl laurate, methyl (meth)acrylate, ethyl (meth)acrylate, butyl (meth)acrylate, hexyl (meth)acrylate, cyclohexyl (meth)acrylate, benzyl (meth)acrylate, and phenyl (meth)acrylate; styrene, vinyl toluene, etc.

By properly selecting monomers and adjusting the mixing ratio, binder resins having an acidic group for use in the particulate material can be prepared.

Specific examples of the monomer having a basic group for use in the binder resin having a basic group include N-methylaminoethyl (meth)acrylate, N-ethylaminoethyl (meth)acrylate, N,N-dimethylaminoethyl (meth)acrylate, N,N-diethylaminoethyl (meth)acrylate, N,N-dibutylaminoethyl acrylate, N,N-di-tert-butylaminoethyl acrylate, N-phenylaminoethyl methacrylate, N,N-diphenylaminoethyl methacrylate, aminostyrene, dimethylaminostyrene, N-methylaminoethylstyrene, dimethylaminoethoxystyrene, diphenylaminoethylstyrene, N-phenylaminoethylstyrene, 2-N-piperidylethyl (meth)acrylate, 2-vinyl pyridine, 4-vinyl pyridine, 2-vinyl-6-methyl pyridine, etc.

By polymerizing or copolymerizing one or more of these monomers optionally with one or more of other monomers such as the monomers mentioned above, the resins having a basic group and insoluble in the hydrocarbon solvent can be prepared. By properly selecting monomers and adjusting the mixing ratio, binder resins having a basic group for use in the particulate material can be prepared.

Specific examples of such dyes or pigments for use as the colorant in the particulate material include known dyes and pigments, e.g., metal oxides such as silica, titania, and alumina; black colorants such as carbon blacks, aniline blacks, furnace blacks, and lamp blacks; cyan colorants such as Phthalocyanine Blue, Methylene Blue, Victoria Blue, Methyl Violet, Aniline Blue, and ultramarine blue; magenta colorants such as Rhodamine 6G Lake, dimethylquinacridone, Watchung Red, Rose Bengale, Rhodamine B, and Alizarine Lake; yellow colorants such as Chrome Yellow, Benzidine Yellow, Hansa Yellow, Naphthol Yellow, Molybdenum Orange, Quinoline Yellow, Tartrazine Yellow, etc.

When a colorant such as carbon blacks and metal oxides, on which a monomer can be grafted, is used, one or more of the monomers having an acidic group or a basic group may be reacted with the colorant such that the acidic or basic group has a chemical bonding with the colorant.

The weight ratio (C/R) of the colorant (C) with a binder resin (R) is preferably 0.1/100 to 1000/100, and more preferably from 1/100 to 300/100.

Suitable solvents for use as the hydrocarbon solvent 4 in the dispersion include known hydrocarbon solvents such as aliphatic hydrocarbons (including alicyclic hydrocarbons) and aromatic hydrocarbons.

It is preferable to add in the hydrocarbon solvent 4 a dye, which is soluble in the hydrocarbon solvent used and which has a color different from the color of the colored particulate material.

Suitable resins for use as the resin 5 soluble in the hydrocarbon solvent 4 include known resins. The resin 5 preferably have a stronger gravitational interaction with the surface of the colored particulate material 3 than with the hydrocarbon solvent 4 because the resin 5 is adsorbed on the particulate material 3, resulting in exertion of a stereo effect, and thereby the stability of the colored particulate material 3 can be enhanced.

Specific examples of the resin 5 soluble in the hydrocarbon solvent 4 include the polymer and copolymers constituted of a monomer having an acidic or basic group mentioned above for use as the binder resin having an acidic or basic group and insoluble in the hydrocarbon solvent and optionally one or more of the monomers listed above for use in the binder resin.

It is needed to prepare resins having an acidic or basic group and soluble in the hydrocarbon solvent 4 by properly selecting monomers and adjusting the mixing ratio such that the resins are soluble in the hydrocarbon solvent 4.

Suitable compounds for use as the compound having a nonionic polar group include compounds which are soluble in hydrocarbon solvent 4 and have a larger dielectric constant than the hydrocarbon solvent 4 and which do not ionically dissociate themselves. Specific examples of such compounds include ethers, esters, alcohols, ketones, amides, etc.

The weight ratio C/H of such a compound having a nonionic polar group (C) to the hydrocarbon solvent 4 (H) is 0.1/100 to 10/100.

The dispersion contained in the cell of the image display medium of the present invention can be prepared, for example, by mixing the components mentioned above in a hydrocarbon and dispersing using a ball mill, a sand mill, an attritor or the like dispersing means. The mixing order is not particularly limited.

In the second embodiment of the present invention, the resin soluble in the hydrocarbon solvent further has a nonionic polar group. Namely, the resin has both a nonionic polar group and one of an acid group and a basic group.

As the resin having both a nonionic polar group and an acid group, resins made by, for example, copolymerizing a monomer having an acid group and a monomer having a nonionic polar group. Specific examples of the monomer having an acid group include the monomers mentioned above for use in the binder resin.

Specific examples of the monomer having a nonionic polar group include 2-hydroxyethyl (meth)acrylate, 2,3-dihydroxypropyl (meth)acrylate, 4-hydroxybutyl (meth)acrylate, 2-hydroxy-3-propyl methacrylate, methoxypolyethyleneglycol methacrylate, methoxypolypropyleneglycol methacrylate, 2-chloroethyl (meth)acrylate, 2,3-dibromopropyl (meth)acrylate, (meth)acrylonitrile, isobutyl-2-cyanoacrylate, 2-cyanoethyl acrylate, ethyl-2-cyanoacrylate, methacrylacetone, tetrahydrofurfurylmethacrylate, trifluoroethylmethacrylate, p-nitrostyrene, vinylpyrrolidone, acrylamide, methacrylamide, N,N-dimethylmethacrylamide, N,N-dibutylmethacrylamide, etc.

In addition, the copolymers may include as a constituent one or more of the following monomers:
alkyl or aryl esters of (meth)acrylic acid such as 2-ethylhexyl (meth)acrylate, octyl (meth)acrylate, nonyl (meth)acrylate, decyl (meth)acrylate, lauryl (meth)acrylate, stearyl (meth)acrylate, vinyl laurate, methyl (meth)acrylate, ethyl (meth)acrylate, butyl (meth)acrylate, hexyl (meth)acrylate, cyclohexyl (meth)acrylate, benzyl (meth)acrylate, and phenyl (meth)acrylate; styrene, vinyl toluene, etc.

As the resin having both a nonionic polar group and a basic group, resins made by, for example, copolymerizing a monomer having a basic group and a monomer having a nonionic polar group. Specific examples of the monomer having a basic group are mentioned above for use in the binder resin. In addition, specific examples of the monomers having a nonionic group are also mentioned above. In addition, the resin may include as a constituent one or more of the monomers mentioned above (i.e., alkyl or aryl esters of (meth)acrylic acid, styrene, vinyl toluene, etc.).

In the third embodiment of the present invention, the colored particulate material has a nonionic polar group. Such a colored particulate material can be prepared, for example, by any one of the following methods:

(1) a colorant (e.g., dyes and pigments) is dispersed in a binder resin which is constituted of a monomer having an acidic group and a monomer having a nonionic polar group and which is insoluble in the hydrocarbon solvent used; and (2) a colorant is dispersed in a resin which is constituted of a monomer having a basic group and a monomer having a nonionic polar group and which is insoluble in the hydrocarbon solvent used.

Specific examples of the monomers having an acidic group, monomers having a basic group and monomers having a nonionic polar group are mentioned above.

In addition, when a colorant such as carbon blacks and metal oxides, on which a monomer can be grafted, is used, a monomer having a nonionic group, and one of an acidic group and a basic group may be reacted with the colorant such that the groups have chemical bonding with the colorant.

Suitable dispersing media for use in the dispersion include aliphatic hydrocarbons (including alicyclic hydrocarbons) and aromatic hydrocarbons.

Specific examples of the aliphatic hydrocarbons include pentane, cyclopentane, hexane, cyclohexane, heptane, cycloheptane, octane, nonane, decane, dodecane, ligroin, solvent naphtha (e.g., ISOPAR H, G, L and K, manufactured by Exxon Corp. and SHELLSOL manufactured by Shell Oil Co.), etc.

Specific examples of the aromatic hydrocarbons include benzene, toluene, xylene, alkylbenzene, etc. In general, aromatic hydrocarbons can dissolve resins well, and therefore, the flexibility in selection of the resin soluble in the hydrocarbon solvent can be enhanced.

The particle diameter of the colored particulate material is preferably from 0.1 to 10 $\mu$m. The smaller the particle diameter of the colored particulate material used, the higher the resolution of the resultant display image. However, when the particle diameter is too small, the cohesion of the particulate material increases, and therefore it becomes hard to prepare a dispersion having good dispersion stability. To the contrary, when the particle diameter of the particulate material is relatively large, the dispersion stability of the resultant dispersion is good, however, it is hard to prepare a display medium having good resolution.

The weight ratio (C/R) of the colorant (C) to the binder resin (R) in the colored particulate material is preferably from 0.1/100 to 1000/100. When the content of the colorant is too high, the response of the resultant display medium deteriorates although the contrast of the resultant display images increases. This is because the charges generated on the particulate material decrease since the content of the resin component, which generates ions on the particulate material due to acid-base dissociation on the surface of the particulate material, decreases. To the contrary, when the content of the colorant is too low, the response of the resultant display medium is maintained, however, it is hard to display high contrast images.

The dispersion of the image display medium of the present invention preferably includes water in an amount of from 100 ppm to 2000 ppm. In general, hydrocarbon solvents include a small amount of water therein, however, it is preferable to further add water to control the water content of the dispersion.

When the water content is too low, ions generated on the particulate material decreases, resulting in deterioration of the response of the resultant display medium. To the contrary, when the water content is too high, water is separated from the hydrocarbon (i.e., the dispersion is separated into two phases).

Figure 4:
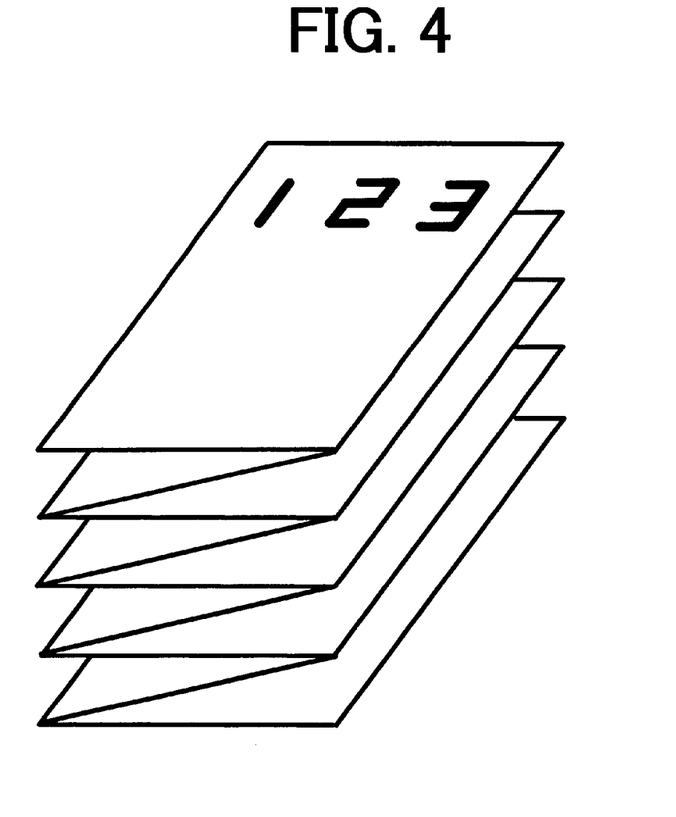
FIG. 4 is a schematic view illustrating yet another embodiment of the image display medium of the present invention.

FIG. 4 is a schematic view illustrating yet another embodiment of the image display medium of the present invention. The image display medium has a fanfold shape (a so-called digital paper). In order to display images in the medium, a charge (voltage) is applied to the medium from outside. The information displayed therein can be preserved for a long period of time. In addition, the medium is rewritable as mentioned above.

Figure 5:
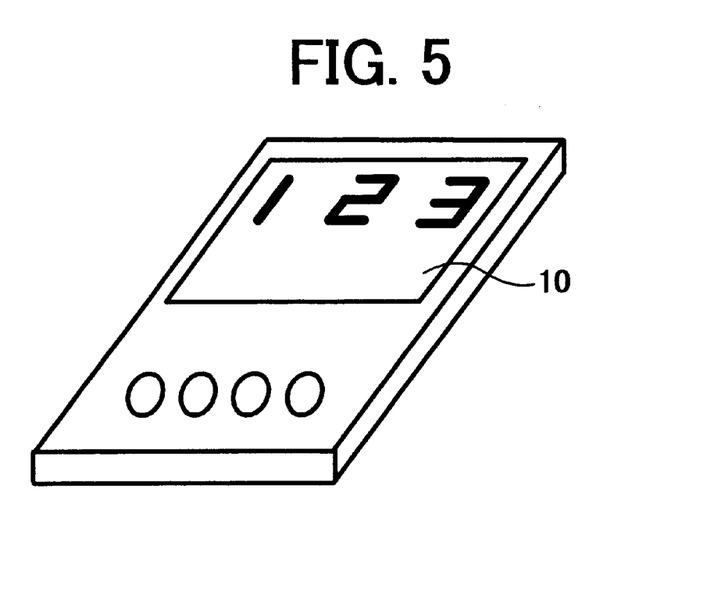
FIG. 5 is a schematic view illustrating an embodiment of the image display device of the present invention.

FIG. 5 is a schematic view illustrating an embodiment of the image display device of the present invention. This display device shapes like a pocket personal computer. The display device has an image display medium 10, which is the image display medium of the present invention, and a voltage applicator (not shown) inside the device. The display device may have a connector through which a voltage is applied to the device to display images, instead of the voltage applicator.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Example 1

Preparation of Dispersion

Preparation of Binder Resin Having an Acidic Group

In a flask having a stirrer, a thermometer and a reflux condenser, 200 parts of toluene was contained and then heated to 85° C. Next, a mixture of 16 parts of methyl methacrylate, 4 parts of methacrylic acid and 0.1 parts of azobisisobutylonitrile was dropped therein for 1 hour while stirring the mixture. The mixture was further stirred at the temperature for 4 hours. Thus, the reaction was completed. After the reaction, the solvent was removed to obtain a binder resin having an acidic group.

Preparation of Resin Having a Basic Group

In a flask having a stirrer, a thermometer and a reflux condenser, 200 parts of ISOPAR H was contained and then heated to 85° C. Next, a mixture of 19 parts of lauryl methacrylate, 1 part of N,N-diethylaminoethyl methacrylate and 0.1 parts of azobisisobutylonitirile was dropped therein for 1.5 hours while stirring the mixture. The mixture was heated to 90° C. and further stirred for 4 hours. As a result, a uniform and clear resin solution can be obtained.

Preparation of Dispersion

The following components were mixed and dispersed in a ball mill to prepare a dispersion.

| Resin solution prepared above | 100 |
|---|---|
| Titanium oxide | 2 |
| Binder resin having an acidic group prepared above | 10 |
| Butyl stearate | 0.5 |
| Dye (MACROLEX BLUE RR) | 0.1 |
| (Preparation of display medium) | |

A polyester film having a thickness of 100 μm and an opening of 1 cm² was sandwiched by two substrates each having an ITO electrode to form a cell having a thickness of 100 μm and an area of 1 cm². Then the dispersion prepared above was contained in the cell.

(Displaying Image)

When a voltage of −100 V was applied to the upper ITO electrode, the particulate material quickly deposited on the lower electrode. Then a voltage of +100 V was applied to the upper electrode, the particulate material moves toward the upper electrode and deposited thereon. When these operations were repeated 100 times, the movement of the particulate material was stably repeated. In addition, the displayed image was maintained even when the applied voltage was off.

Example 2

Preparation of Dispersion

Preparation of Binder Resin Having a Basic Group

In a flask having a stirrer, a thermometer and a reflux condenser, 500 parts of ISOPAR H was contained and then heated to 80° C. Next, a mixture of 10 parts of lauryl methacrylate, 80 parts of ethyl methacrylate, 10 parts of di-tert-butylaminoethyl acrylate and 0.2 parts of azobisisobutylonitrile was dropped therein for 1 hour while stirring the mixture. The mixture was heated to 85° C. and further stirred for 4 hours. Thus, the reaction was completed. After the reaction, the solvent was removed to obtain a binder resin having a basic group.

Preparation of Resin Having Both an Acidic Group and a Nonionic Group and Soluble in the Hydrocarbon Solvent Used In a flask having a stirrer, a thermometer and a reflux condenser, 500 parts of ISOPAR H was contained and then heated to 80° C. Next, a mixture of 50 parts of 2-ethylhexyl methacrylate, 5 parts of methacrylic acid, 5 part of hydroxyethyl methacrylate and 0.1 parts of azobisisobutylonitirile was dropped therein for 1 hour while stirring the mixture. The mixture was heated to 85° C. and further stirred for 4 hours. As a result, a uniform and clear resin solution can be obtained.

Preparation of Dispersion

The following components were mixed and dispersed in a ball mill to prepare a dispersion.

| Resin solution prepared above | 100 |
|---|---|
| Phthalocanine | 7 |
| Binder resin having a basic group prepared above | 3 |
| Dye (OIL BLACK 109) | 0.1 |
| (Preparation of display medium) | |

A polyester film having a thickness of 100 μm and an opening of 1 cm² was sandwiched by two substrates each having an ITO electrode to form a cell having a thickness of 100 μm and an area of 1 cm². Then the dispersion prepared above was contained in the cell.

Displaying Image

When a voltage of +100 V was applied to the upper ITO electrode, the particulate material quickly deposited on the lower electrode. Then a voltage of −100 V was applied to the upper electrode, the particulate material moves toward the upper electrode and deposited thereon. When these operations were repeated 100 times, the movement of the particulate material was stably repeated. In addition, the displayed image was maintained even when the applied voltage was off.

Example 3

Preparation of Dispersion

Preparation of Binder Resin Having Both an Acidic Group and a Nonionic Polar Group In a flask having a stirrer, a thermometer and a reflux condenser, 400 parts of toluene was contained and then heated to 90° C. Next, a mixture of 50 parts of butyl acrylate, 70 parts of methyl methacrylate, 40 parts of cyclohexyl methacrylate, 85 parts of 2-hydroxyethyl methacrylate, 50 parts of 2,3-dibromopropyl acrylate, 5 parts of styrenesulfonic acid and 3 parts of benzoylperoxide was dropped therein for 5 hours while stirring the mixture. The mixture was heated to 95° C. and further stirred for 2 hours. Thus, the reaction was completed. After the reaction, the solvent was removed to obtain a binder resin having both an acidic group and a nonionic group.

Preparation of Resin Having a Basic Group

In a flask having a stirrer, a thermometer and a reflux condenser, 500 parts of ISOPAR H was contained and then heated to 90° C. Next, a mixture of 80 parts of stearyl methacrylate, 10 parts of methoxypolypropyleneglycol methacrylate (molecular weight of 482), 5 parts of dimethylaminoethyl methacrylate and 5 parts of benzoylperoxide was dropped therein for 1 hour while stirring the mixture. The mixture was further stirred for 3 hours. As a result, a uniform and clear resin solution can be obtained.

Preparation of Dispersion

The following components were mixed to prepare a dispersion.

| Resin solution prepared above | 100 |
|---|---|
| Copper phthalocyanine disulfonic acid sodium salt | 7 |
| Water | 800 ppm |

When the concentration of water was severely measured using a Karl Fischer moisture meter, the concentration was 920 ppm.

Preparation of Display Medium

A polyester film having a thickness of 100 μm and an opening of 1 cm² was sandwiched by two substrates each having an ITO electrode to form a cell having a thickness of 100 μm and an area of 1 cm². Then the dispersion prepared above was contained in the cell.

Displaying Image

When a voltage of −100 V was applied to the upper ITO electrode, the particulate material quickly deposited on the lower electrode. Then a voltage of +100 V was applied to the upper electrode, the particulate material moves to the upper electrode. When these operations were repeated 100 times, the movement of the particulate material was stably repeated. In addition, the displayed image was maintained even when the applied voltage was off.

As clearly understood from the above-description, the image display medium of the present invention can reversibly display an image even when used for a long period of time and in addition has an image maintaining property.

The surface of the colored particulate material in the dispersion can be uniformly charged positively or negatively, which is caused by the acidic group or basic group of the hydrocarbon-soluble resin. Therefore, the image display medium has high response.

In addition, when the hydrocarbon-soluble resin has one of an acidic group and a basic group with a polar group, the surface of the colored particulate material in the dispersion can be uniformly charged positively or negatively due to the interaction of the one of an acidic group and a basic group with the polar group. Therefore, the image display medium has a higher response.

When the surface of the colored particulate material has an acidic group or a basic group, the surface of the colored particulate material can be uniformly charged positively or negatively. Therefore, the image display medium has high response.

In addition, when the colored particulate material has one of an acidic group and a basic group with a polar group, the surface of the colored particulate material in the dispersion can be uniformly charged positively or negatively due to the interaction of the one of an acidic group and a basic group with the polar group. Therefore, the image display medium has a higher response.

Since an acid-base dissociation occurs between the acidic group (or the basic group) on the colored particulate material and the basic group (or the acidic group) on the hydrocarbon-soluble resin, the image display medium has high response and can repeatedly and stably display images for a long period of time.

In addition, since a hydrocarbon solvent is used as the dispersing medium, the image display medium has high safety in practice. Namely, the image display medium has high safety even when environmental conditions are largely changes.

Further, when an aromatic hydrocarbon is used, the hydrocarbon-soluble resin can be selected from various kinds of resins, and therefore the dispersibility of the colored particulate material and the response of the image display medium can be easily controlled.

Further, even when the colored particulate material has a relatively small particle diameter, the colored particulate material has good dispersibility, and therefore the resultant image display medium can display images having high resolution when repeatedly used for a long period of time.

In addition, since the pigment concentration can be heightened, the image display medium can display images having high contrast even when repeatedly used for a long period of time.

When water is added in the dispersion, the water serves as a solvation component, and therefore the quantity of the generated charges increases. Therefore, the image display medium has higher response.

This document claims priority and contains subject matter related to Japanese Patent Application No. 2000-168181, filed on Jun. 5, 2000, incorporated herein by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. An image display medium comprising:
   a pair of electroconductive layers, at least one of said electroconductive layers being light-transmissive and said electroconductive layers being opposed each other to form a cell; and
   a dispersion contained in the cell and comprising:
      a colored particulate material having at least one of an acidic group and a basic group;
      a hydrocarbon solvent;
      a resin soluble in the hydrocarbon solvent and having at least one of a basic group and an acidic group; and
      a compound having a nonionic polar group,
   wherein when the particulate material has an acidic group, the resin has a basic group, and when the particulate material has a basic group, the resin has an acidic group.

2. The image display medium according to claim 1, wherein the resin soluble in the hydrocarbon solvent further has a nonionic polar group.

3. The image display medium according to claim 1, wherein the colored particulate material further has a nonionic polar group.

4. The image display medium according to claim 1, wherein the hydrocarbon solvent is an aliphatic hydrocarbon.

5. The image display medium according to claim 1, wherein the hydrocarbon solvent is an aromatic hydrocarbon.

6. The image display medium according to claim 1, wherein the colored particulate material has an average particle diameter ranging from 0.1 to 10 $\mu$m.

7. The image display medium according to claim 1, wherein the colored particulate material comprises a colorant and a binder resin insoluble in the hydrocarbon solvent, wherein a weight ratio (C/R) of the colorant (C) to the binder resin (R) is from 0.1/100 to 1000/100.

8. The image display medium according to claim 7, wherein the binder resin has the at least one of an acidic group or a basic group of the colored particulate material.

9. The image display medium according to claim 8, wherein the binder resin further has a nonionic polar group.

10. The image display medium according to claim 1, wherein the dispersion further comprises water in an amount of from 100 ppm to 2000 ppm.

11. An image display device comprising:
   an image display medium comprising:
      a pair of electroconductive layers, at least one of said electroconductive layers being light-transmissive, and said electroconductive layers being opposed each other to form a cell; and
      a dispersion contained in the cell and comprising:
         a colored particulate material having at least one of an acidic group and a basic group;
         a hydrocarbon solvent;
         a resin soluble in the hydrocarbon solvent and having at least one of a basic group and an acidic group; and
         a compound having a nonionic polar group,
      wherein when the particulate material has an acidic group, the resin has a basic group, and when the particulate material has a basic group, the resin has an acidic group; and
   at least one member selected from the group consisting of voltage applicators configured to apply a voltage between the pair of electroconductive layers to display an image and connectors through which a voltage is applied to the device to display an image.

12. The image display device according to claim 11, wherein the resin soluble in the hydrocarbon solvent further has a nonionic polar group.

13. The image display device according to claim 11, wherein the colored particulate material further has a nonionic polar group.

14. The image display device according to claim 11, wherein the hydrocarbon solvent is an aliphatic hydrocarbon.

15. The image display device according to claim 11, wherein the hydrocarbon solvent is an aromatic hydrocarbon.

16. The image display device according to claim 11, wherein the colored particulate material has an average particle diameter ranging from 0.1 to 10 $\mu$m.

17. The image display device according to claim 11, wherein the colored particulate material comprises a colorant and a binder resin insoluble in the hydrocarbon solvent, wherein a weight ratio (C/R) of the colorant (C) to the binder resin (R) is from 0.1/100 to 1000/100.

18. The image display device according to claim 17, wherein the binder resin has the at least one of an acidic group or a basic group of the colored particulate material.

19. The image display device according to claim 13, wherein the binder resin further has a nonionic polar group.

20. The image display device according to claim 11, wherein the dispersion further comprises water in an amount of from 100 ppm to 2000 ppm.

* * * * *